United States Patent
Fukuzaki et al.

Patent Number: 5,714,984
Date of Patent: Feb. 3, 1998

[54] POSITION DETECTING DEVICE AND POSITION POINTING DEVICE THEREFOR

[75] Inventors: Yasuhiro Fukuzaki; Yuji Katsurahira, both of Saitama-ken, Japan

[73] Assignee: Wacom Co., Ltd., Saitama-ken, Japan

[21] Appl. No.: 388,264

[22] Filed: Feb. 13, 1995

[30] Foreign Application Priority Data

Feb. 24, 1994 [JP] Japan ............... 6-026993

[51] Int. Cl.$^6$ ............... G09G 5/00
[52] U.S. Cl. ............... 345/174; 345/179; 178/19
[58] Field of Search ............... 345/173, 174, 345/177, 178, 179, 156; 178/18, 19

[56] References Cited

U.S. PATENT DOCUMENTS

| | | | |
|---|---|---|---|
| 5,097,415 | 3/1992 | Yoshimura et al. | 345/177 |
| 5,134,388 | 7/1992 | Murakami et al. | 345/173 |
| 5,138,118 | 8/1992 | Rusell | 178/19 |
| 5,308,936 | 5/1994 | Biggs et al. | 178/19 |
| 5,349,139 | 9/1994 | Verrier et al. | 345/179 |
| 5,373,118 | 12/1994 | Watson | 178/18 |

FOREIGN PATENT DOCUMENTS

| | | | |
|---|---|---|---|
| 0259894 | 3/1988 | European Pat. Off. | 345/174 |
| 63-70326 | 3/1988 | Japan. | |
| 3-189716 | 8/1991 | Japan. | |
| 3-189717 | 8/1991 | Japan. | |

*Primary Examiner*—Richard Hjerpe
*Assistant Examiner*—Lun-Yi Lao
*Attorney, Agent, or Firm*—Lowe, Price, LeBlanc & Becker

[57] ABSTRACT

A position pointing pen to be used with a position detecting tablet having multiple sequentially activated coils includes a resonance circuit. In response to the resonance circuit receiving from the tablet a wave having greater than a predetermined amplitude, a sequence of twelve different time slots is established during which loading of the resonance circuit is controlled. During eight of the time slots, the resonance circuit is loaded with pen coordinate information obtained from the tablet coils. During a synchronizing time slot the resonance circuit is loaded by a fixed resistor. During the other three time slots the resonance circuit is loaded with other information, e.g. pen pressure, pen up/down, and color. When a coil of the tablet receives two substantially identical wave sequences from the pen the synchronizing containing slot is extracted and a CPU determines pen position and the other information.

12 Claims, 9 Drawing Sheets

POSITION DETECTING DEVICE AND POSITION POINTING DEVICE THEREFOR

BACKGROUND OF THE INVENTION

1. Field of the Invention

The present invention relates to improvements in a position detecting device and a position pointing device therefor, which employ electric waves, and more particularly to such devices wherein synchronization information is coupled from the pointing device to the detecting device.

2. Description of the Related Art

Prior to the instant application, the applicant has proposed, in Japanese Patent Application No. 61-213970 (Japanese Patent Laid-Open No. 63-70326), a position detecting device in which a tablet exchanges electric wave signals with a position pointing device so as to determine the coordinate value of a position pointed by the position pointing device.

Briefly, the position detecting device disclosed in Japanese Patent Laid-Open No. 63-70326 has a plurality of loop coils constituting the tablet and is adapted to transmit an electric wave of a predetermined frequency. The electric wave is received by a resonance circuit provided in the position pointing device so that resonance takes place in the resonance circuit to emit electric wave. This electric wave is received by the loop coil so that a voltage is inducted in the loop coil. This operation is conducted successively on the plurality of loop coils constituting the tablet, so that the coordinate value of the position pointed by the position pointing device is determined based on the levels of the voltages induced in the loop coils.

The position detecting device of the type described faces a demand for the ability to enter various kinds of information in addition to the coordinate value of a pointed position, such as information which indicates that the position pointing device, e.g., a pen or the like, has been set to a position for pointing a definite position (this state will be referred to as "pen-down state," hereinafter), information concerning the type of the position pointing device, e.g., a pen, a cursor or the like, as well as a demand for inputting, together with the coordinate values, information for continuously varying values of parameters other than the coordinate information, such as, for example, thickness or width of a line and hue or density (brightness) of the position or area appointed by the pointing device.

To cope with such demands, the device disclosed in Japanese Patent Laid-Open No. 63-70326 employs a manual switch which selectively connects, to the resonance circuit which is constituted by a coil and a capacitor, an additional capacitor so as to slightly vary the resonance frequency, the slight variation in the resonance frequency being detected as a variation in the phase angle so as to be used as information indicative of the aforesaid various types of information (hereinafter referred to as "pointing device information").

The device according to the aforesaid Japanese Patent Laid-Open No. 63-70326 requires, however, that the range, over which the resonance frequency of the resonance circuit varies as the switch is operated, precisely coincide with a predetermined range, which is centered at the frequency of the electric wave transmitted from the loop coil. A laborious adjusting work is required to attain such matching of the frequency ranges. Further, the detectable range of phase angle is limited to be about −60° to about +60°. Furthermore, a certain tolerance for the phase angle to be detected has to be set in order to accommodate any change in the inductance of the coil and in the capacitance of the capacitor of the resonance circuit caused by a change in the ambient temperature. These problems led to a limited number of types of pointing device information, which can be entered, and especially when the resonance frequency is designed to continuously change according to pen pressure, no pointing device information other than pen pressure information can be entered.

Under this circumstance, the same applicant proposed a position detecting device and a position pointing device therefor in Japanese Patent Application No. 1-327276 (Japanese Patent Laid-Open No. 3-189716) and Japanese Patent Application No. 1-327277 (Japanese Patent Laid-Open No. 3-189717), wherein the position pointing device is provided with a code generator, which issues a plurality of particular bits of binary code when a switch is operated, an additional capacitor is connected and disconnected to and from the coil and capacitor composing a resonance circuit via an electronic switch in accordance with a plurality of bits of binary code issued from the code generator and also in synchronization with the transmitting and receiving timings of the electric waves in order to cause the resonance frequency to change slightly according to the plurality of bits of binary code, and the slight change in the resonance frequency caused by the binary code is detected by the tablet as a change in phase angle to reproduce the binary code, thereby making it possible to enter a number of pieces of pointing device information, which corresponds to the bit number of a plurality of bits of binary code.

In the position detecting device described above, however, a change in the resonance frequency of the resonance circuit unavoidably changes the level of received signal (induced voltage); therefore, preventing accurate detection of a coordinate value from being carried out if the resonance frequency changes according to the aforesaid binary code during coordinate detection. To cope with the problem, in the device according to Japanese Patent Laid-Open Nos. 3-189716 and 3-189717, a period for coordinate detection and a period for code identification are provided beforehand so that these two periods are engaged alternately. In addition, the tablet transmits special timing information for enabling the position pointing device to distinguish between the two periods; more specifically, it transmits an electric wave which lasts markedly longer than the transmitting time of an electric wave during the coordinate detection period. Every time a predetermined number of regular electric waves are transmitted or received, which follows the transmission of a lengthy electric wave expressing the above-mentioned special timing information, the resonance frequency of the resonance circuit is changed in accordance with the plurality of bits of binary code, thus supplying or transmitting the pointing device information represented by the plurality of bits of binary code from the position pointing device to the tablet.

Hence, the devices disclosed in Japanese Patent Laid-Open Nos. 3-189716 and 3-189717 suffer from the following disadvantages: the tablets need to be designed to vary the transmitting time of electric waves and the position pointing devices need to be designed to identify the lengthy electric wave expressing the special timing information. Furthermore, the lengthy electric wave representing the special timing information does not have any data concerning the coordinate value of a pointed position or the pointing device information, inevitably taking much time to transmit the coordinate value of the pointed position or the pointing device information, leading to inefficient transmission of information.

SUMMARY OF THE INVENTION

In view of the above-described problems of the prior art, the present invention is aimed at providing a position detecting device and a position pointing device therefor which permit a simpler configuration and also efficient transmission of the coordinate value of a pointed position and the pointing device information.

To this end, according to one aspect of the present invention, there is provided a position detecting device comprising: a position pointing device equipped with a resonance circuit having a predetermined resonance characteristic, an information setting means for setting pointing device information, a resonance characteristic varying circuit for changing the predetermined resonance characteristic to a particular resonance characteristic representing synchronous information and also to the resonance characteristic expressing the aforesaid set pointing device information (the particular resonance characteristic expressing the synchronous information is excluded) according to external control, a timing extracting means for extracting a plurality of timings at which induced voltage occurs in the resonance circuit intermittently and lasts for a predetermined duration at certain intervals, and a characteristic control means for controlling the resonance characteristic varying circuit so that the foregoing particular resonance characteristic is obtained at a preselected timing among the plurality of timings at which the induced voltage intermittently occurs and also the resonance characteristic expressing the set pointing device information is obtained at a particular timing based on the aforesaid preselected timing; and a tablet equipped with an electric wave generating means for intermittently generating an electric wave, which drives the resonance circuit of the position pointing device, for a predetermined duration at certain intervals, an electric wave detecting means for detecting an electric wave generated from the resonance circuit of the position pointing device, a synchronous detecting means for detecting a preselected timing at which the resonance characteristic of the resonance circuit of the position pointing device turns into the aforesaid particular resonance characteristic from the detected electric wave, an information identifying means for detecting the resonance characteristic of the resonance circuit of the position pointing device from the electric wave detected at a particular timing based on the preselected timing and converting it into the pointing device information, and a coordinate detecting means for determining the coordinate value of the position pointed by the position pointing device from the detected electric wave.

The above and other objects, features and advantages of the present invention will become clear from the following description when the same is read in conjunction with accompanying drawings.

DESCRIPTION OF THE PREFERRED EMBODIMENTS

Before turning to the description of preferred embodiments, a description will be given of various basic forms of the present invention.

Figure 1:
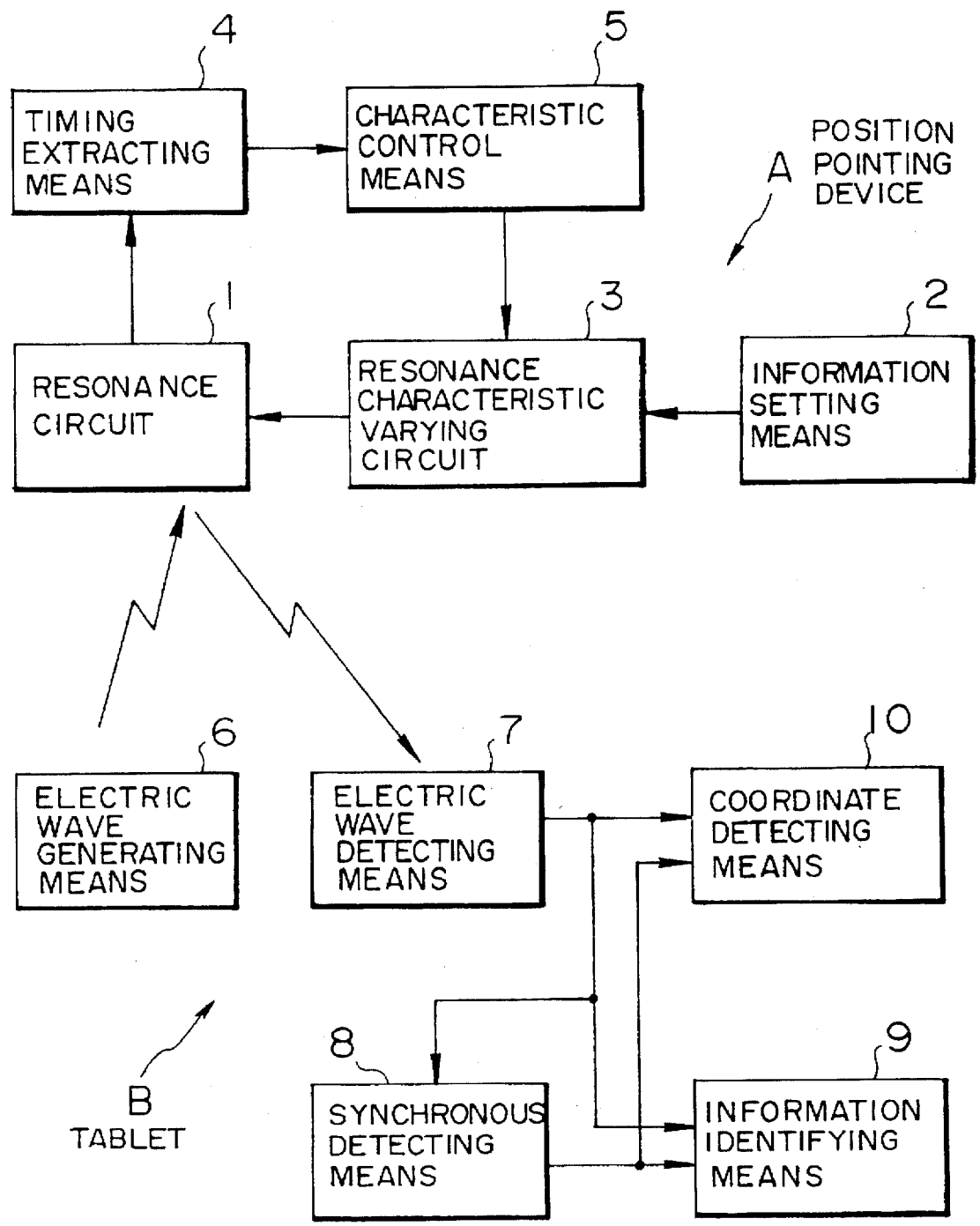
FIG. 1 is a block diagram of a basic form of the position detecting device and the position pointing device in accordance with a preferred embodiment of the present invention.

FIG. 1 is a diagram of the basic form of the position detecting device and the position pointing device therefor in accordance with the present invention. Position pointing device A in accordance with this basic form of the invention has a resonance circuit 1 having a predetermined resonance characteristic, an information setting means 2 for setting pointing device information, a resonance characteristic varying circuit 3 for changing the predetermined resonance characteristic of circuit 1 to (1) a particular resonance characteristic representing synchronous information and (2) the resonance characteristic expressing the aforesaid set pointing device information (the particular resonance characteristic expressing the synchronous information is excluded) according to external control, a timing extracting means 4 for extracting a plurality of timings at which induced voltage occurs in the resonance circuit 1 intermittently and lasts for a predetermined duration at certain intervals, and a characteristic control means 5 for controlling the resonance characteristic varying circuit 3 so that the foregoing particular resonance characteristic is obtained with a preselected timing among the plurality of timings at which the induced voltage intermittently occurs and also the resonance characteristic expressing the set pointing device information is obtained at a particular timing based on the aforesaid preselected timing.

Tablet B in accordance with the basic form of the invention is equipped with an electric wave generating means 6 for intermittently generating an electric wave, which drives the resonance circuit 1 of position pointing device A, for a predetermined duration at certain intervals, an electric wave detecting means 7 for detecting an electric wave generated from the resonance circuit 1 of position pointing device A, a synchronous detecting means 8 for detecting a preselected timing at which the resonance characteristic of the resonance circuit 1 of position pointing device A turns into the aforesaid particular resonance characteristic from the electric wave detected by the electric wave detecting means 7, an information identifying means 9 for detecting the resonance characteristic of the resonance circuit 1 of position pointing device A from the electric wave detected at a particular timing based on the preselected timing and converting it into the pointing device information, and a coordinate detecting means 10 for determining the coordinate value of the position pointed by position pointing device A from the electric wave detected by the electric wave detecting means 7.

The resonance circuit 1 is normally constituted by a coil and a capacitor and it has a predetermined resonance characteristic based on the resonance frequency, internal loss or attenuation thereof, or a combination of these.

The information setting means 2 sets the information for varying the pointing device information such as pen-down information, line thickness, and the information for changing the hue, density (brightness), etc. of a pointed position or a specified area, as the impedance of a circuit element connected to a switch which turns ON/OFF in accordance with operation, the impedance which changes in accordance with an operation expressed by a continuous amount such as pen pressure or a plurality of bits of binary code corresponding to the impedance, a plurality of bits of binary code generated from a well-known code generator in accordance with the operation of a plurality of switches, or the like.

The resonance characteristic varying circuit 3 changes the predetermined resonance characteristic of the resonance circuit 1 to the particular resonance characteristic expressing the synchronous information by connecting a particular circuit element to the resonance circuit 1 and also changing it to the resonance characteristic representing the aforesaid set pointing device information by connecting and disconnecting an additional circuit element via a switch which is turned ON/OFF in accordance with the plurality of bits of binary code mentioned above.

The timing extracting means 4 detects the induced voltages produced in the resonance circuit 1 due to the electric wave which is generated intermittently from the electric wave generating means 6 of tablet B at certain intervals and lasts for the predetermined duration and it extracts voltages of a certain level or higher by subjecting the detected induced voltages to a low-pass filter (integrating circuit) having a predetermined time constant, thereby extracting a plurality of timings at which the induced voltage intermittently occurs at the certain intervals and lasts for the predetermined duration.

The characteristic control means 5 including a counter for counting the plurality of timings, which have been extracted, and controls the resonance characteristic varying circuit 3 so that the aforesaid particular resonance characteristic is obtained at a preselected time the plurality of timers, e.g., at a timing which follows two consecutive timings for maintaining the predetermined resonance characteristic, particularly eight consecutive timings for maintaining the predetermined resonance characteristic during the coordinate detection period and also the resonance characteristic representing the pointing device information is obtained at the particular timing based on the preselected timing, e.g., at the timing following the preselected time, particularly at the three consecutive timings following the preselected timings, and further these are repeated. Specifically, at a preselected timing, the particular circuit element is connected to the resonance circuit 1 and at the particular timing, the circuit element connected to the switch, which turns ON/OFF in accordance with operation, is connected or the circuit element the impedance of which varies in accordance with the operation expressed by a continuous amount such as pen pressure is connected or the additional circuit element is connected or disconnected in accordance with a plurality of bits of binary code generated from the well-known code generator in accordance with the plurality of bits of binary code corresponding to the impedance of the circuit element or in accordance with the operation of the plurality of switches. This operation is repeated.

The electric wave generating means 6 is constituted by, for example, a plurality of loop coils arranged in parallel in the position detecting direction or an auxiliary antenna coil provided in the vicinity thereof, an oscillator which generates an AC signal for generating an electric wave for driving the resonance circuit 1 of position pointing device A, typically an AC signal of a nearly identical frequency to the resonance frequency of the resonance circuit 1, and a switching circuit which is connected and disconnected to and from the above components for a predetermined duration at certain intervals. The electric wave detecting means 7 is constituted by the same loop coils as those of the electric wave generating means 6 or a plurality of loop coils arranged in a completely different position detecting direction or the plurality of loop coils and an auxiliary antenna coil provided in the vicinity thereof.

The synchronous detecting means 8 detects the resonance characteristic of the resonance circuit 1 of position pointing device A from the electric wave detected by the electric wave detecting means 7, e.g., the level of the induced voltage occurring in the aforesaid loop coils or the auxiliary antenna coil or the phase difference from the aforesaid AC signal or the time-dependent variations in these factors. If the detected resonance characteristic is the particular resonance characteristic mentioned above, synchronous detecting means 8 then outputs the timing thereof as the preselected timing and sends the output to the information identifying means 9.

The information identifying means 9 detects the resonance characteristic of the resonance circuit 1 from, among the electric waves emitted from the resonance circuit 1 of position pointing device A detected by the electric wave detecting means 7, the electric wave which is generated at the particular timings based on the preselected timing, e.g., at the three timings following the preselected timing, i.e., at the timings when the resonance characteristic of the resonance circuit 1 is controlled in accordance with the pointing device information, then it outputs the corresponding pointing device information according to the detected resonance characteristic.

The coordinate detecting means 10 detects, for example, the levels of a plurality of induced voltages occurring in the aforesaid plurality of loop coils from the electric waves emitted from the resonance circuit 1 of position pointing device A detected by the electric wave detecting means 7, particularly from the electric waves generated at timings other than the aforesaid preselected timing and the particular timing based on the preselected timing, e.g., at eight consecutive timings before the above-mentioned preselected timing (in other words, the eight consecutive timings following the aforesaid three consecutive timings, i.e., at the timings for maintaining the predetermined resonance characteristic, and detects the maximum value in the level distribution, i.e., the coordinate value of a position specified by position pointing device A.

In FIG. 1, the electric wave generating means 6 intermittently generates the electric wave for driving the resonance circuit 1 of position pointing device A for a predetermined duration at certain intervals. The electric wave is received by the resonance circuit 1 of position pointing device A and it intermittently generates an induced voltage for the predetermined duration at the certain intervals. The timing extracting means 4 extracts the timings at which the induced voltage is intermittently generated and supplies them to the characteristic control means 5. The characteristic control means 5 controls the resonance characteristic varying circuit 3 at a preselected timing out of the timings at which the induced voltage intermittently occurs, e.g., at the ninth timing from the moment the timing extracting means 4 starts issuing the timings in order to change the resonance characteristic of the resonance circuit 1 to the particular resonance characteristic, e.g., to change the resonance frequency, by connecting the particular circuit element.

Thus, an electric wave the frequency of which has been changed from that of the electric wave generated by the electric wave generating means 6 is emitted from the resonance circuit 1, and the electric wave is detected by the electric wave detecting means 7. The synchronous detecting means 8 detects that the resonance circuit 1 exhibits the particular resonance characteristic from the electric wave detected by the electric wave detecting means 7 and supplies the detection results to the information identifying means 9 and the coordinate detecting means 10.

The characteristic control means 5 controls the resonance characteristic varying circuit 3 at particular timings based on a preselected timing among the timings at which the induced voltage intermittently occurs, e.g., at three consecutive timings which follow the preselected timing in order to change the resonance characteristic of the resonance circuit 1 to the resonance characteristic representing the position pointing device; it charges the resonance characteristic such as the resonance frequency by connecting, for example, a circuit element connected to a switch which turns ON/OFF in accordance with operation by connecting a circuit element having a characteristic value which varies in accordance with the operation expressed by a continuous amount.

At this time, as in the case described above, the electric wave having a frequency of which has been changed to that of the electric wave generated by the electric wave generating means 6 is emitted from the resonance circuit 1. The electric wave is emitted by circuit 1 detected by the electric wave detecting means 7. The information identifying means 9 receives a signal, containing synchronous information from the synchronous detecting means 8 and detects the frequency of the electric wave occurring at three consecutive timings following the synchronous timing; i.e., the frequency of the electric wave occurring at the timings at which the resonance characteristic of the resonance circuit 1 is controlled in accordance with the pointing device information. Information identifying means 9 then outputs corresponding pointing device information based on the detected frequency.

Further, the characteristic control means 5 does not control the resonance characteristic varying circuit 3 at the eight consecutive timings, which follow the aforesaid three timings, among the timings at which the induced voltage intermittently occurs, thus keeping the resonance characteristic of the resonance circuit 1 unchanged. The coordinate detecting means 10 responds to the electric wave derived from circuit 1 to determine the coordinate value of a position pointed by position pointing device A Detecting means 10 responds from the intensity distribution of the electric wave, detected detecting means 7 at the eight consecutive timings.

The following describes the embodiments of the present invention in conjunction with the drawings.

Figure 2:
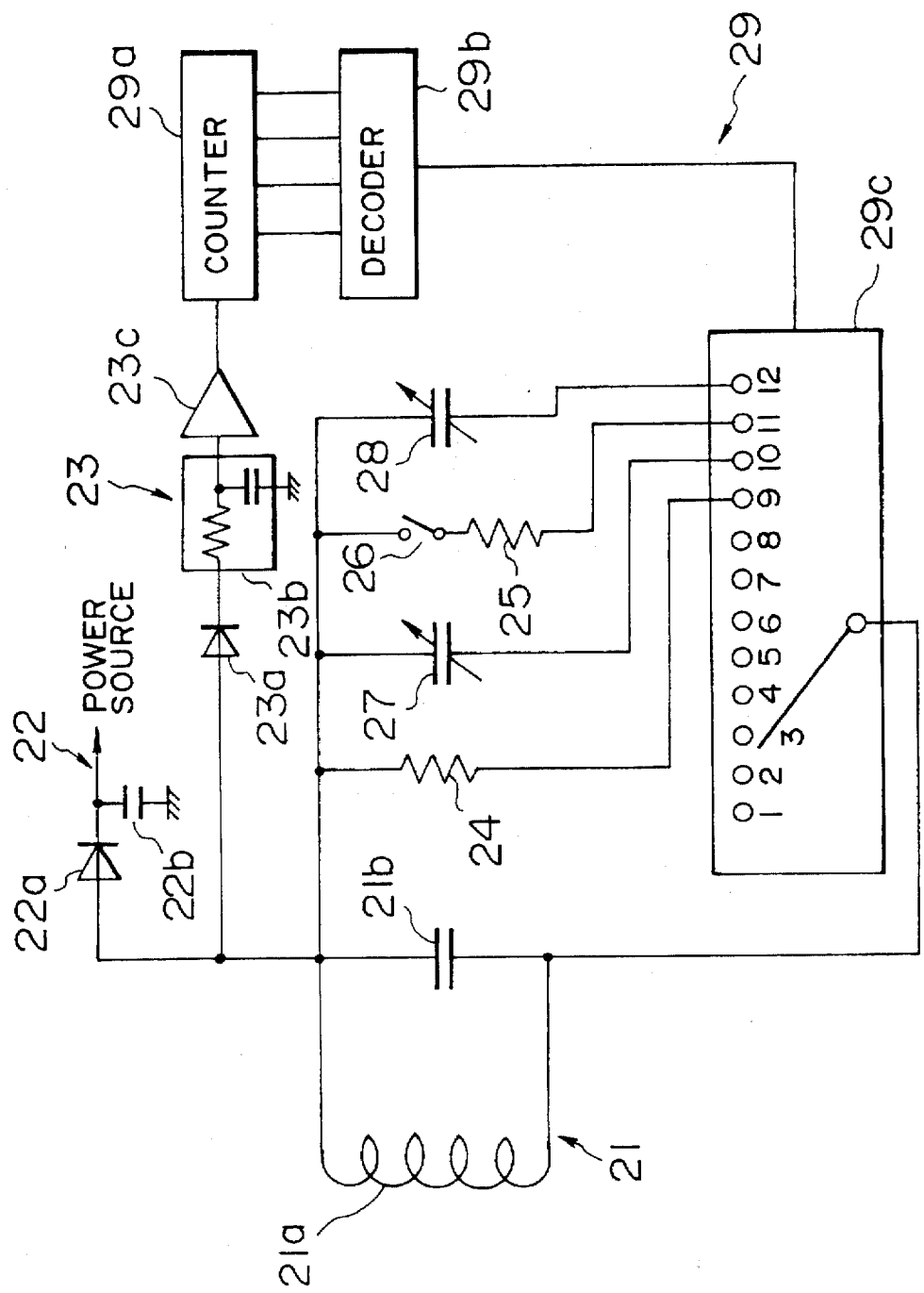
FIG. 2 is a circuit diagram of a first embodiment of a position pointing device in accordance with a preferred embodiment of the present invention.

FIG. 2 is a circuit diagram of the first embodiment of the position pointing device A in accordance with the present invention. In the drawing, numeral 21a denotes a coil, numerals 21 b and 22b capacitors, numerals 22a and 23a diodes, numeral 23b a low-pass filter (LPF), numeral 23c a comparator, numerals 24 and 25 resistors, numeral 26 a switch, numerals 27 and 28 variable capacitors, numeral 29a a counter, numeral 29b a decoder, and numeral 29c an analog multiplexer.

The coil 21a and the capacitor 21b are connected in parallel to constitute a well-known resonance circuit 21 which has a predetermined resonance characteristic. The diode 22a and the capacitor 22b constitute a power circuit 22 which derives a DC voltage from the induced voltage occurring in the resonance circuit 21 and supplies it as a line, i.e. DC power supply, voltage to other circuits.

The diode 23a, the low-pass filter 23b, and the comparator 23c constitute a clock generating circuit 23 which extracts a voltage induced intermittently in circuit 21 that occurs at certain intervals and lasts for a predetermined duration. Circuit 23 shapes the waveform induced in the resonance circuit 21 to generate a clock. The clock generating circuit 23 constitutes timing extracting means 4.

The resistor 24 increases the internal loss of the resonance circuit 21. More specifically, the resistor 24 causes the induced voltage occurring in the resonance circuit 21 to decrease to a level which is high enough for the clock to be extracted in the aforesaid clock generating circuit 23.

Figure 3:
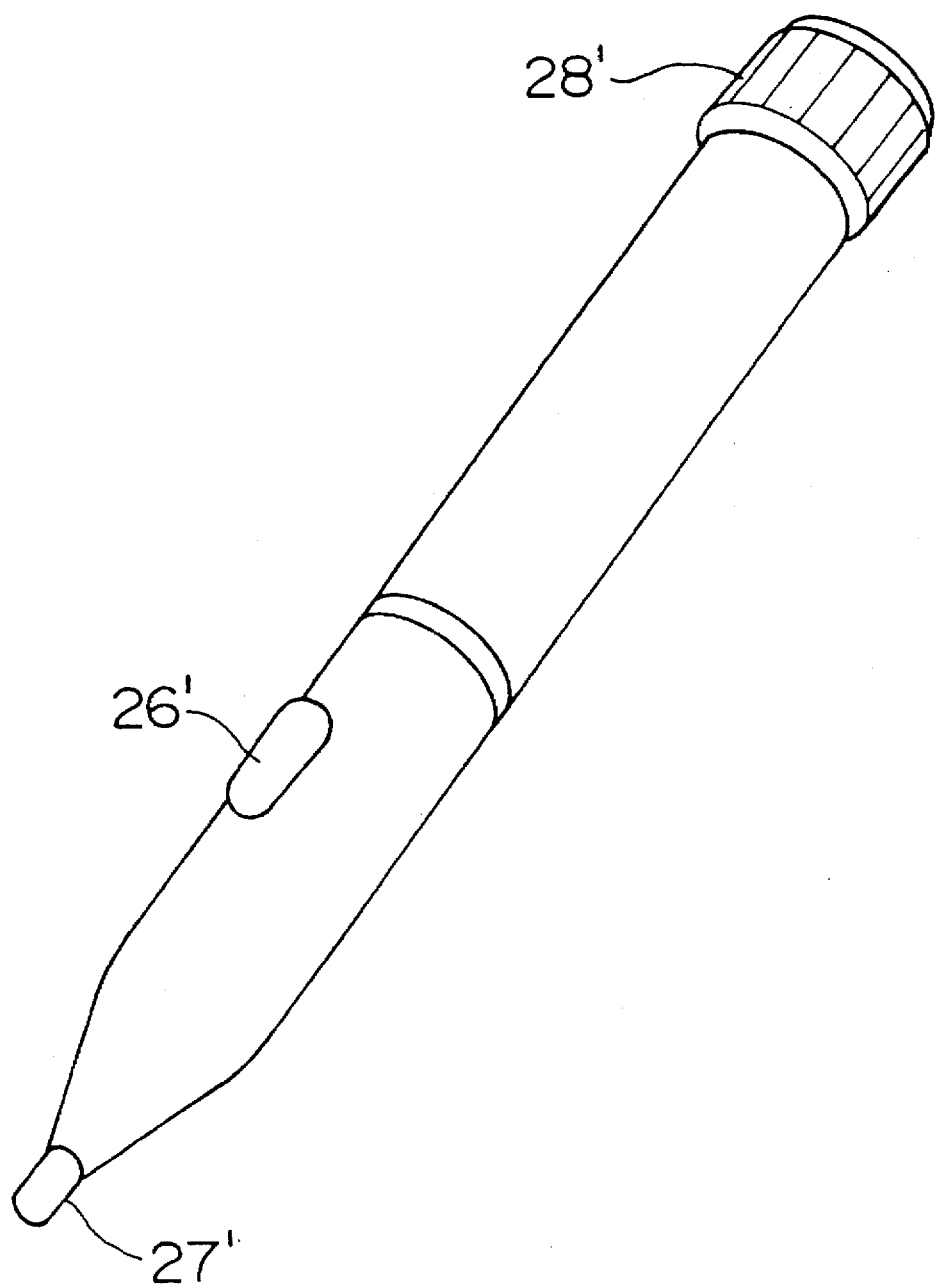
FIG. 3 is a diagram of an exemplary position pointing device that can be used with the present invention.

The resistor 25 is connected to the switch 26 which turns ON/OFF as manually operated switch knob 26' (FIG. 3) is operated. The capacitance of variable capacitor 27 varies with the pressure applied to a pen tip 27' of a pen shaped enclosure illustrated in FIG. 3. The capacitance of variable capacitor 28 varies with the rotational angle of manually operated dial ring 28' (FIG. 3) for setting the pointing device information represented by the continuous amount, including a pointed position or the hue information on a specified area.

The resistor 24 is connected in parallel to the capacitor 21b of the resonance circuit 21 via the analog multiplexer 29c at a preselected clock timing among a plurality of clock timings, which will be discussed later. Resistor 24 changes the resonance characteristic of the resonance circuit 21 to a particular resonance characteristic. The variable capacitor 27, the resistor 25, the switch 26, and the capacitance-variable capacitor 28 constitute a resonance characteristic varying circuit 3. The components 25–28 of circuit 3 are selectively connected by multiplexer 29 in parallel with the capacitor 21b of the resonance circuit 21 at the three clock timings following the above-mentioned preselected clock timing. Hence components 25–28 change the resonance characteristic of the resonance circuit 21 to the resonance characteristic which represents the pointing device information, i.e., the pen pressure information, the switch information, and the continuous amount information. The resistor 25 and the switch 26, and the capacitance-variable capacitors 27, 28 also constitute information setting means 2.

As discussed later, in this embodiment, the preselected timing at which the resistor 24 is connected by multiplexer 29c to the resonance circuit 21 is identified by information identifying means 9 at tablet B. Identifying means 9 compares the resonance characteristic at a preselected time with the resonance characteristic at two preceding consecutive clock times. Hence, the resistance values of resistors 24 and 25 are preferably the same. The range over which the capacitances of the capacitance-variable capacitors 27 and 28 vary in accordance with operation is set so as to fully coincide with the range (about −60° to about +60°) within which the variations in the resonance frequency of the resonance circuit 21 caused by the changes in the capacitances can be detected as phase angles in relation to the resonance frequency.

The counter 29a, preferably a well-known hexadecimal counter, counts the number of clock pulses and supplies the counted value to the decoder 29b. The decoder 29b decodes the count value of the counter 29a and outputs a switching signal for the analog multiplexer 29c. The analog multiplexer 29c is provided with twelve selectable terminals which are selectively connected in sequence in accordance with the switching signal derived by decoder 29b. Connected to the 9th through 12th selectable terminals are the aforesaid resistor 24, capacitance-variable capacitor 27, resistor 25 and switch 26, and capacitance-variable capacitor 28. Nothing is connected to the 1st through 8th selectable terminals.

The circuit 29, FIG. 2, including elements 29a through 29c constitute characteristic control means 5 of FIG. 1. Circuit 29 connects nothing to the resonance circuit 21 during the first eight consecutive clock times derived from decoder 29b to maintain the predetermined resonance characteristic during the coordinate detection period. Circuit 29 connects the resistor 24 to the resonance circuit 21 during a clock time which follows the eight clock times to obtain the particular resonance characteristic, i.e. during the ninth clock time derived from decoder 9b. Circuit 29 respectively connects variable capacitor 27, resistor 25 and the switch 26, and the variable capacitor 28 in sequence during the three clock times which follow the ninth clock time, i.e. during the tenth, eleventh and twelfth clock times. In this way information representing the resonance characteristic of the pointing device A is sequentially derived from circuit 29 and supplied to circuit 21 to control the resonance circuit. The timed connecting operations controlled by circuit 29 as described above are repeated.

Figure 4:
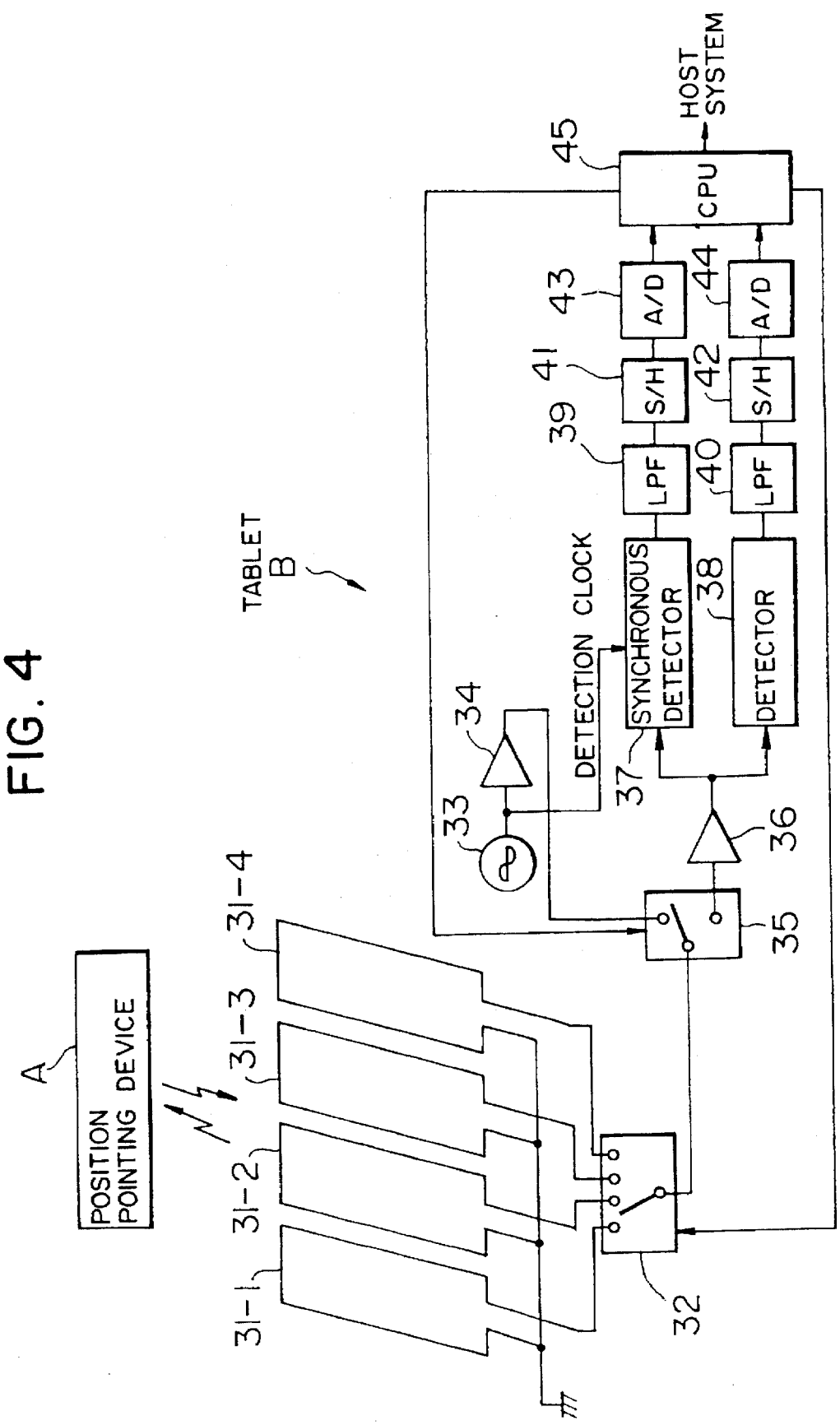
FIG. 4 is a circuit diagram of a first embodiment of a tablet of a position detecting device in accordance with a preferred embodiment of the present invention.

FIG. 4 is a circuit diagram of a first embodiment of the tablet of the position detecting device of the present invention. In the drawing, numerals 31-3, 31-2, 31-3, and 31-4 denote loop coils, numeral 32 a selector circuit, numeral 33 an oscillator, numeral 34 a current driver, numeral 35 a transmit/receive switching circuit, numeral 36 a receiving amplifier, numeral 37 a synchronous detector, numeral 38 a detector, numerals 39 and 40 low-pass filters (LPFs), numerals 41 and 42 sample holding circuits (S/H), numerals 43 and 44 analog-to-digital (A/D) converting circuits, and numeral 45 a central processing unit (CPU). These components constitute tablet B.

The loop coils 31-1 through 31-4 are arranged approximately in parallel to each other in the position detecting direction, one end of each being connected to the selector circuit 32 and the other end being grounded in common. The selector circuit 32 selects one of the loop coils 31-1 through 31-4 in accordance with a selecting signal received from the central processing unit 45 in a manner to be described later.

The oscillator 33 generates a sinusoidal AC signal of a frequency which is nearly equal to the resonance frequency of the resonance circuit 21 of position pointing device A and sends it to the current driver 34 and the synchronous detector 37. The current driver 34 converts the AC signal into an electric current that it supplies to the transmit/receive switching circuit 35. The transmit/receive switching circuit 35 connects the loop coil selected by the selector circuit 32 to the current driver 34 and the receiving amplifier 36 alternately in accordance with a certain transmit/receive switching signal received from the central processing unit 45 in a manner to be discussed later.

The receiving amplifier 36 amplifies the induced voltage which occurs in the selected loop coil and sent through the selector circuit 32 and the transmit/receive switching circuit 35, then sends the amplified induced voltage to the synchronous detector 37 and the detector 38.

The synchronous detector 37 synchronously detects the induced voltage occurring in the foregoing selected loop coil, i.e., the received signal, with the AC signal from the oscillator 33 used as the detection signal and sends it to the low-pass filter 39. The detector 38 detects the induced voltage occurring in the loop coil, i.e., the received signal and supplies it to the low-pass filter 40.

The low-pass filters 39 and 40 have cut-off frequencies which are considerably lower than the resonance frequency of the resonance circuit 21; they convert the signals output from the synchronous detector 37 and the detector 38 into DC signals and send the DC signals to the A/D converting circuits 43 and 44 via the sample holding circuits 41 and 42. The A/D converting circuits 43 and 44 carry out analog-to-digital conversion on the outputs of the low-pass filters 39 and 40, respectively and supply them to the central processing unit 45.

Figure 5:
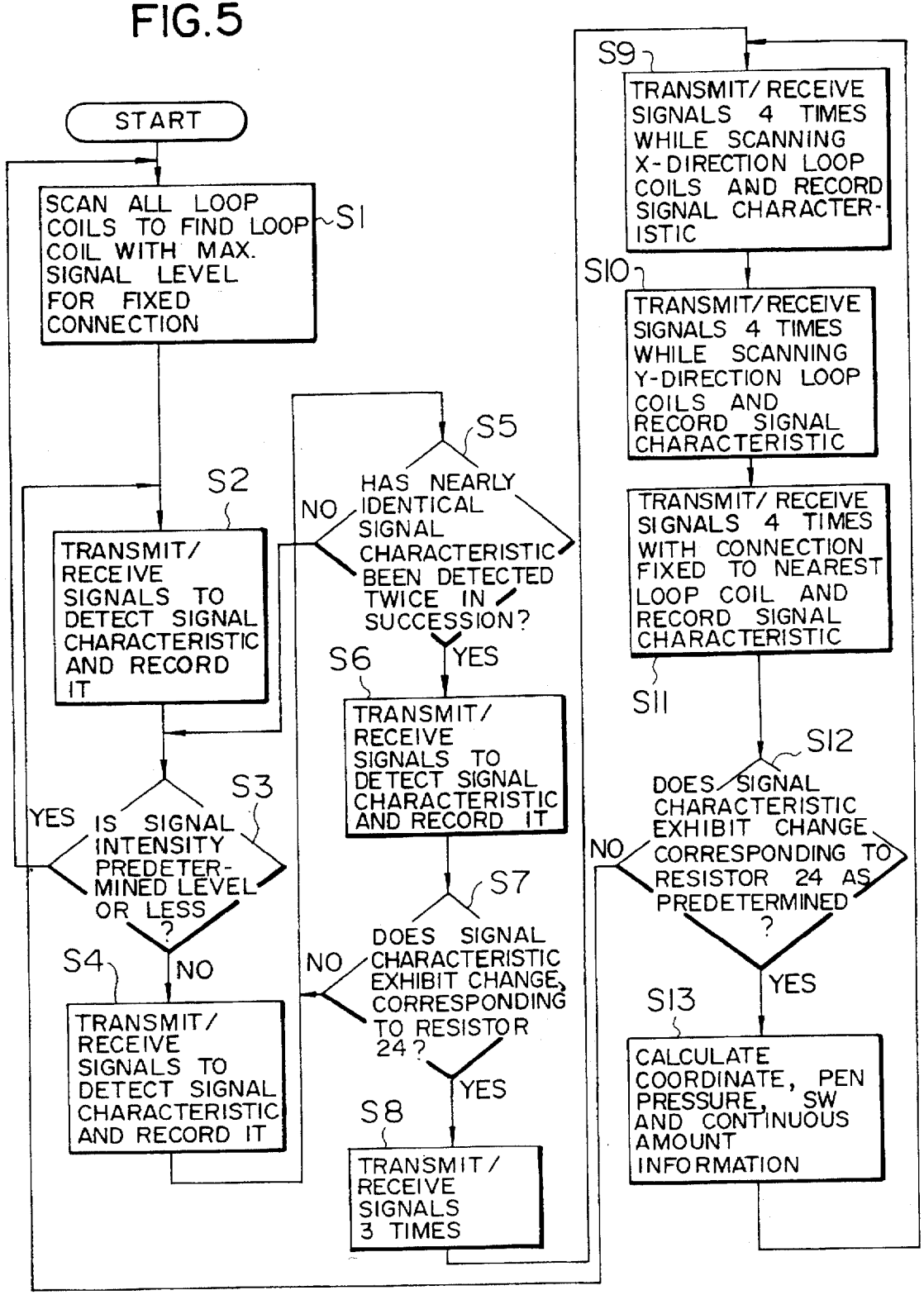
FIG. 5 is a flowchart of the operations of the device illustrated in FIG. 4.

The central processing unit 45 supplies a certain transmit/receive switching signal to the transmit/receive switching circuit 35 and supplies a selecting signal to the selector circuit 32 in accordance with the flowchart given in FIG. 5. The central processing unit 45 further calculates the position of the resonance circuit 21 of device A in accordance with the level distribution of the received signals, which occurs in the loop coils 31-1 through 31-4 and are converted to digital values by the A/D converting circuit 44; it also detects the phase angle of the received signals in accordance with the levels of the received signals which occurred in the loop coil located closest to the resonance circuit 21 among the loop coils 31-1 through 31-4 and which have been converted into digital values by the A/D converting circuit 43, detects the internal loss in accordance with the levels of the received signals which have been converted into digital values by the A/D converting circuit 44, detects the resonance characteristic of the resonance circuit 21 from the detected internal loss, detects the synchronous information in accordance with the flowchart shown in FIG. 5, and identifies the pointing device information.

The loop coils 31-1 through 31-4, the oscillator 33, the current driver 34, and the transmit/receive switching circuit 35 constitute the electric wave generating means 6 of Tablet B. The loop coils 31-1 through 31-4 and the receiving amplifier 36 constitute the electric wave detecting means 7 and the synchronous detector 37, the detector 38, the low-pass filters (LPFs) 39, 40, the sample holding circuits (S/H) 41, 42, the analog-to-digital (A/D) converting circuits 43, 44, and the central processing unit 45 which performs processing of the flowchart shown in FIG. 5 constitute the synchronous detecting means 8, the information identifying mean 9, and the coordinate detecting means 10

The following describes the operations of the position detecting device and the position pointing device in accordance with the flowchart shown in FIG. 5. Tablet B mentioned above has loop coils 31-1 through 31-4 and a plurality of like loop coils arranged to orthogonally cross each other a selector circuit like the one mentioned previously, and an additional circuit selectively connected in order to perform alternate positional detection, thereby detecting a pointed position in two orthogonal directions, namely, X and Y directions.

The central processing unit 45 sends to the selector circuit 32 a selecting signal for selecting in sequence all the loop coils 31-1 through 31-4 (strictly speaking, all the loop coils in the Y direction, which are not shown, are included) and causes electric waves to be transmitted and received by the loop coils 31-1 through 31-4 in order. At this time, if position pointing device A is within the reaching range of the electric waves emitted from tablet B, then the resonance circuit 21 of position pointing device A reflects the electric waves and causes the loop coils 31-1 through 31-4 to generate induced voltages. The central processing unit 45 detects the induced voltages at the time of selecting the loop coils which is output from the A/D converting circuit 44, i.e., the level of the received signal, and detects the loop coil exhibiting the highest level, i.e., the loop coil nearest to position pointing device A in the X or Y direction (s1).

The central processing unit 45 then performs the transmission and receiving of an electric wave again (s2) through the aforesaid loop coil (in either the X or Y direction) nearest to position pointing device A in order to determine whether the level of the received signal is a predetermined level or more, i.e., whether the level of the induced voltage which allows the clock to be extracted in the clock generating circuit 23 of position pointing device A is greater than the level of that generated in the resonance circuit 21 (s3), and if the level is lower than the predetermined level, then the central processing unit 45 goes back to the process of selecting the loop coils in sequence and transmitting and receiving of an electric wave.

If the level of the received signal is the predetermined level or more, then the central processing unit 45 fixes on a selected loop coil to repeat the transmission and receiving of electric waves from the selected loop coil. At this time, in position pointing device A, the analog multiplexer 29c is activated by a clock extracted by the clock generating circuit 23.

Nothing is connected to the resonance circuit 21 as long as analog multiplexer 29c selects one of the 1st to 8th selectable terminals; therefore, tablet B generates a received signal of the same level and the same phase angle. When, however, the analog multiplexer 29c selects the 9th selectable terminal, tablet B generates a received signal of a level which is lower by an amount determined by and corresponding to the resistance of the resistor 24. When the central processing unit (CPU) 45 detects that the received signal has a level which is lower by an amount corresponding to the resistance of the resistor 24 after it has detected two consecutive received signals of the same level and the same phase angle, the CPU then recognizes the received signal as the synchronous information (S4 through S7, FIG. 5).

After recognizing the synchronous information, the central processing unit 45 carries out the transmission and receipt of electric waves three times at the selected fixed loop coil 31, i.e., CPU 45 repeats the transmission and receipt of electric waves from the fixed selected loop coil 31 as long as the analog multiplexer 29c of position pointing device A selects the 10th to 12th selectable terminals (S8, FIG. 5). Then CPU 45 specifies the loop coil 31 located closest to position pointing device A as the loop coil for transmission. The central processing unit 45 switches the loop coils in sequence only for receiving; the CPU performs the transmission and receipt of electric waves four times each in the X direction and the Y direction, i.e., CPU 45 repeats the transmission and receipt of electric waves as long as the analog multiplexer 29c of position pointing device A selects the 1st to 8th selectable terminals; it detects the levels of the received signals and temporarily stores them (S9, S10, FIG. 5).

The central processing unit 45 then selects and fixes the loop coil 31 located nearest to position pointing device A again and repeats the transmission and receipt of electric waves four times, i.e., as long as the analog multiplexer 29c selects the 9th to 12th selectable terminals; CPU 45 detects the levels and phase angles of the received signals and temporarily stores them (S11, FIG. 5).

Further, the central processing unit 45 determines whether the signal received while the analog multiplexer 29c of position pointing device A is selecting the 9th selectable terminal has the level which is lower by the amount corresponding to the resistance value of the resistor 24, i.e., whether the synchronous information has been received (S12, FIG. 5). If the determination result is affirmative, CPU 45 then calculates the coordinate values in the X and Y directions from the levels of the signals received while the analog multiplexer 29c of position pointing device A is at terminals 1-8, the levels having been stored as mentioned above. The central processing unit 45 also converts the levels and phase angles of the signals received while the analog multiplexer 29c of position pointing device A is selecting the 10th to 12th selectable terminals into the pen pressure information, the switch information, and the continuous amount information and transfers them to a host system (S13, FIG. 5). After that, the central processing unit 45 repeats the steps S9 through S12 as long as the CPU recognizes the receipt of the synchronous information.

Figure 6:
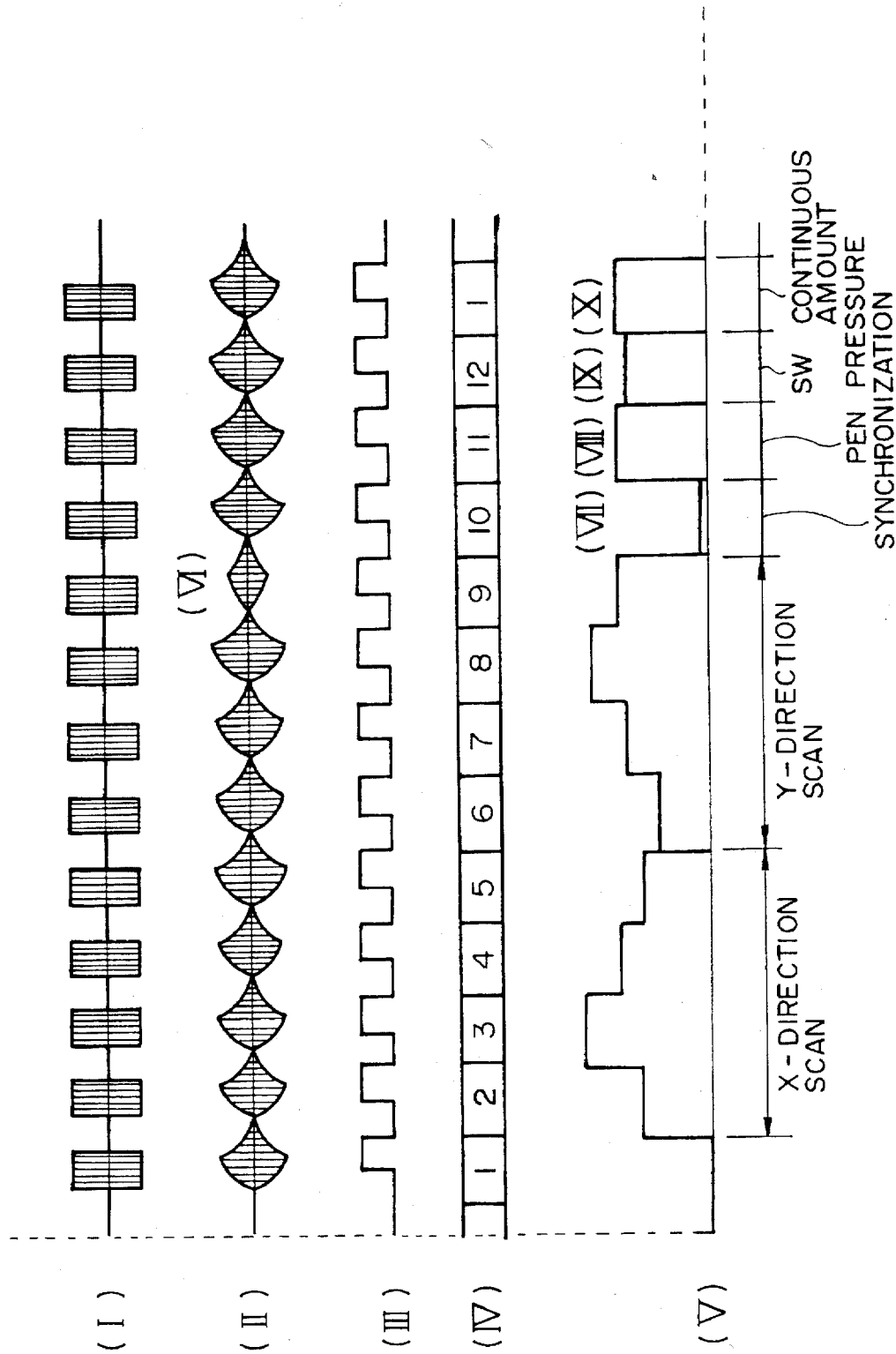
FIG. 6 is an illustration of operational waveforms observed in the first embodiment.

FIG. 6 includes operation waveforms observed with the first embodiment. In the drawing, numeral I denotes the electric wave which is intermittently emitted from the loop coils 31 of tablet B at certain intervals and lasts for the predetermined duration, numeral II represents the induced voltage occurring in the resonance circuit 21 of position pointing device A, numeral III represents the clocks derived from the clock generating circuit 23 of position pointing device A, numeral IV the numbers of the selectable terminals in the analog multiplexer 29c of position pointing device A, and numeral V the amplitudes of the signals received by tablet B. The level of voltage indicated by numeral VI in induced voltage II is lower than the other induced voltages of wave II because the resistor 24 is connected to the resonance circuit 21 at that point. The levels of the signals indicated by numerals VII, VIII, IX, and X in received signals V respectively correspond to the synchronous information, the pen pressure information, the switch information, and the continuous amount information, respectively.

Thus, according to this embodiment, position pointing device A has only to send out the synchronous information associated with signal level VII once out of twelve time positions in synchronization with the timing of the transmission and receipt of an electric wave issued from tablet B. This eliminates the need of the conventional configuration for identifying the electric wave which lasts a relatively long time for expressing the special timing information. The use of the synchronization information associated with level VII also enables tablet B to recognize the time positions when it can obtain coordinate value data and the pointing device information by extracting the synchronous information from the received signals. The synchronization information thus permits error-free detection of the coordinate values and the pointing device information and eliminates the need of the conventional configuration for changing the transmitting time of electric waves. Hence, the configurations of both the position pointing device and the tablet can be made simpler. Furthermore, the transmission of the synchronous information corresponding to only one electric wave transmitting and receiving timing is required, and there is no need to transmit and receive the conventional lengthy electric wave representing the special timing information, thus allowing the coordinate values and pointing device information to be transmitted more efficiently, that is, more quickly.

The central processing unit 45 determines the synchronous information at the timing after it receives the same signal twice in succession in order to recognize the synchronous information without an error even if the resistance value of the resistor 24 is identical to that of the resistor 25; it is needless to say that the number of times of receiving the same signal in succession mentioned above may be set to three or more (but eight or less). Alternatively, if a particular phase angle not used for other pointing device information is set as the synchronous information, then the synchronous timing can be determined more easily because it is no longer necessary to check the levels or phase angles of the received signals at the preceding and following timings.

Figure 7:
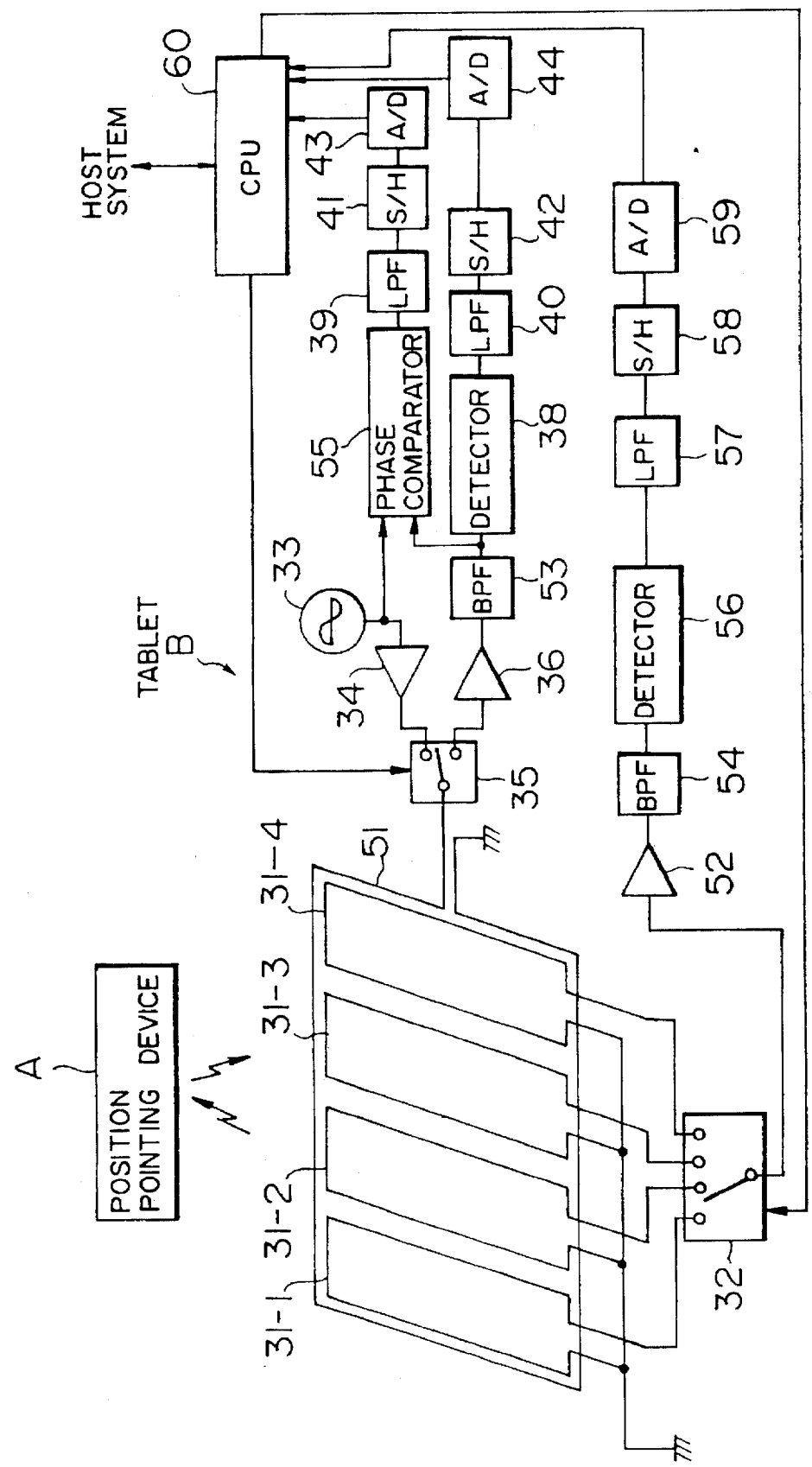
FIG. 7 is a circuit diagram of a second embodiment of a tablet of a position detecting device in accordance with a preferred embodiment of the present invention.

FIG. 7 is a circuit diagram of the second embodiment of the tablet of the position detecting device in accordance with the present invention. This embodiment uses an auxiliary antenna coil to generate electric waves and receive the electric waves for identifying the synchronous information and the pointing device information. In the Figure, an auxiliary antenna coil 51 surrounds the loop coils 31-1 through 31-4; one end of coil 51 is connected to the switching circuit 35 and the other end being grounded. A receiving amplifier 52 is directly connected to the selector circuit 32.

Band pass filters 53 and 54 employ the resonance frequency of the resonance circuit 21 as their central frequency and they derive only the frequency component in the vicinity of the resonance frequency from the aforesaid induced voltage via the receiving amplifiers 36 and 52, respectively. A phase comparator 55 compares the phase of the output signal of the band pass filter 53, i.e., the aforesaid resonance frequency component of the induced voltage occurring in the auxiliary antenna coil 51, and the phase of the AC signal from the oscillator 33 and sends a phase difference signal to the low-pass filter 39.

A detector 56, a low-pass filter (LPF) 57, a sample holding circuit (S/H) 58, and an analog-to-digital (A/D) converting circuit 59 detect received signals which are generated in the loop coils 31-1 through 31-4 and output via the selector circuit 32, the receiving amplifier 52, and the band pass filter 54 and convert the received signals into DC signals and further into digital signals.

Figure 8:
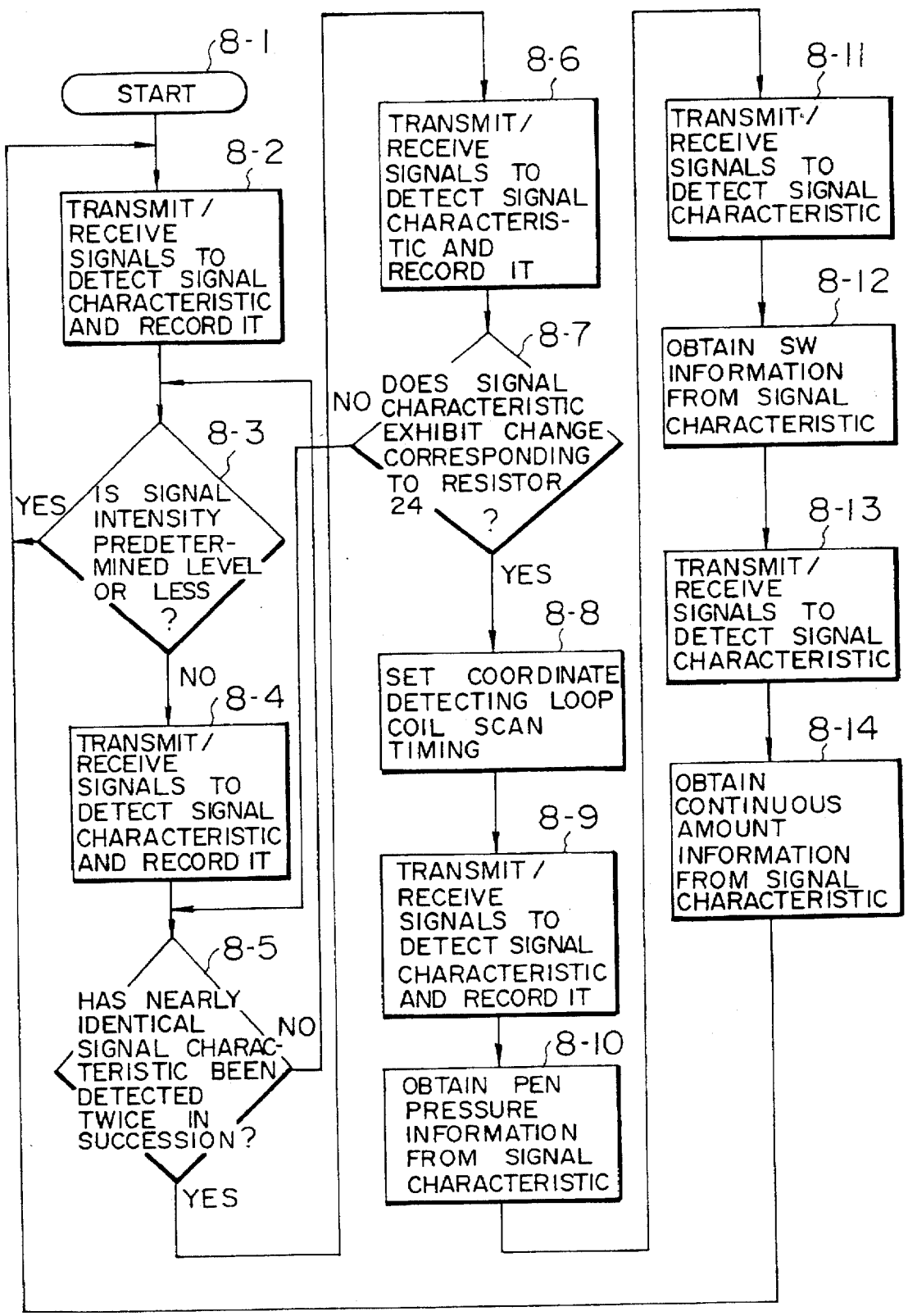
FIG. 8 is a flowchart of the operations of the device illustrated in FIG. 7.

A central processing unit (CPU) 60 supplies a certain transmit/receive switching signal to the transmit/receive switching circuit 35 and also supplies the selecting signal to the selector circuit 32 in accordance with the flowchart shown in FIG. 8. The central processing unit 60 further calculates the position of the resonance circuit 21 in accordance with the level distribution of the received signals, which occurred in the loop coils 31-1 through 31-4 and which have been converted to digital values by the A/D converting circuit 59. CPU 60 also detects the phase angle in accordance with the levels of the received signals which occurred in the auxiliary antenna coil 51 and which have been converted into digital values by the A/D converting circuit 43, detects the internal loss in accordance with the levels of the received signals which have been converted into digital values by the A/D converting circuit 44, detects the resonance characteristic of the resonance circuit 21 from the detected internal loss, detects the synchronous information in accordance with the flowchart shown in FIG. 8, and identifies the pointing device information.

The operations of the devices described above are identical to those of the embodiment shown in FIG. 4 except how the selector circuit 32 behaves when electric waves are generated and when the electric waves for identifying the synchronous information and the pointing device information.

According to this embodiment, the auxiliary antenna coil 51 generates electric waves and receives electric waves for identifying the synchronous information and the pointing device information. This eliminates the need for selecting a loop coil in accordance with the position of position pointing device A when an electric wave is generated and when the electric waves for identifying the synchronous information and the pointing device information are received, thus permitting quicker movement of position pointing device A and reducing the load on the central processing unit 60.

Figure 9:
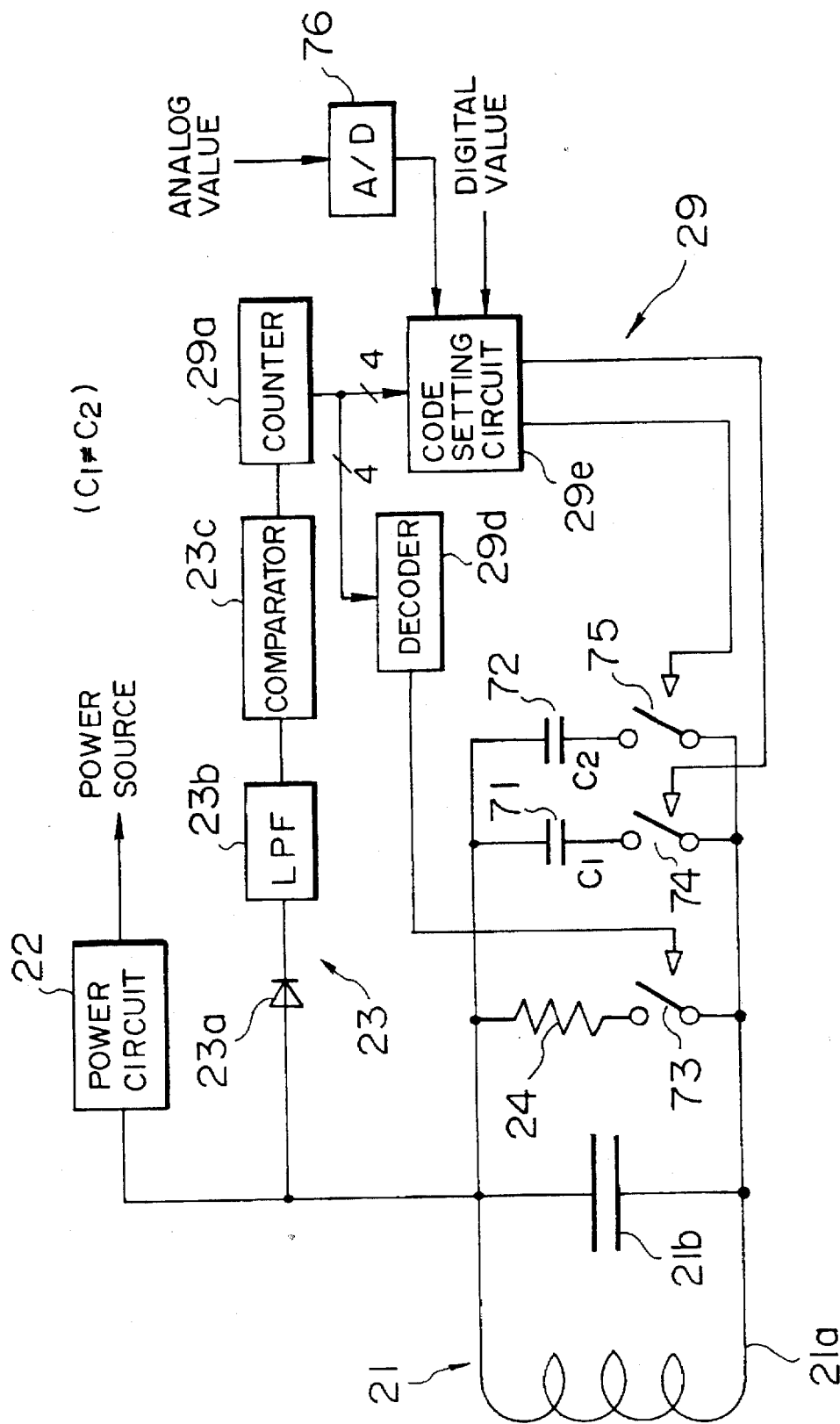
FIG. 9 is a circuit diagram of a second embodiment of the position pointing device in accordance with a preferred embodiment of the present invention.

FIG. 9 is a circuit diagram of the second embodiment of the position pointing device in accordance with the present invention. This embodiment is designed to transmit the pointing device information by expressing the pointing device information in a plurality of bits of binary code. In the Figure, the same component units as those of the embodiment shown in FIG. 2 are given the same reference numerals. Thus, numeral 21a denotes a coil, numerals 21b, 71, and 72 capacitors, numeral 22 a power circuit, numeral 23a a diode, numeral 23b a low-pass filter (LPF), numeral 23c a comparator, numeral 24 a resistor, numeral 29a a counter, numeral 29d a decoder, numeral 29e a code setting circuit, numerals 73, 74 and 75 switches, and numeral 76 an analog-to-digital (A/D) converting circuit.

The resistor 24 is connected in parallel to the capacitor 21b of the resonance circuit 21 via the switch 73 at a preselected clock timing among a plurality of clock timings to change the resonance characteristic of the resonance circuit 21 to the particular resonance characteristic. Likewise, the capacitors 71 and 72 change the resonance frequency of the resonance circuit 21 in accordance with four different combinations of the ON/OFF of the switches 74 and 75 at three clock timings which follow the preselected clock timing so as to change the resonance characteristic of the resonance circuit 21 to one of the four different resonance characteristics.

Resistor 24, the capacitors 71 and 72, and the switches 73 through 75 constitute the resonance characteristic varying circuit 3, FIG. 1. The resonance characteristic varying circuit changes the resonance characteristic of the resonance circuit 21 to the particular resonance characteristic and changes it to the resonance characteristic representing the pointing device information expressed in a plurality of bits of binary code.

The A/D converting circuit 76 converts an analog value corresponding to the pointing device information, e.g., the analog voltage, which is derived from a pressure-sensitive element, not shown, in accordance with the pen pressure, into, for example, an 8-bit digital value, i.e., binary code. The A/D converting circuit 76 in combination with the analog voltage generating source, not shown, constitute the information setting means 2, FIG. 1.

The decoder 29d decodes the count value of the counter 29a and turns the switch 73 ON only when the count value reaches a value which corresponds to the preselected clock timing among a plurality of clock timings. The code setting circuit 29e applies in sequence two bits of the 8-bit digital value supplied from the A/D converting circuit 76 or other code generator, not shown, to the code setting circuit 29e to the switches 74 and 75 at the same time to turn them ON or OFF every time the count value of the counter 27a counting the clocks reaches a value corresponding to the three clock timings following the preselected clock timing.

The decoder 29d and the code setting circuit 29e together with the counter 29a constitute a characteristic control means 29 having reference numeral 5, FIG. 1. The characteristic control means 29 connects nothing to the resonance circuit 21 at eight consecutive timings among the clock timings so as to maintain the predetermined resonance characteristic during the coordinate detection period, while it connects the resistor 24 to the resonance circuit 21 at a timing following the aforesaid eight consecutive timings so as to obtain the particular resonance characteristic that establishes that synchronization interval. The characteristic control means 29 also connects the capacitors 71 and 72 to the resonance circuit 21 at three timings which follows the timing in accordance with two bits of binary code out of the plurality of bits of binary code expressing the pointing device information so as to obtain one of the four different resonance characteristics, and it further controls the resonance characteristic varying circuit so that the above connecting operations are repeated.

The rest of the configuration is the same as that of the embodiment illustrated in FIG. 2. The present position pointing device can be directly applied to the position detecting device shown in FIG. 4 or FIG. 7 by adding a slight change to the program for identifying the pointing device information.

According to the position pointing device of this embodiment, the pointing device information can be transmitted in the form of a plurality of bits of binary code and two bits of binary code can be transmitted at a single clock timing, allowing the pointing device information to be transmitted accurately and efficiently.

Further, the position pointing device of this embodiment is designed to obtain power for driving the circuits from the resonance circuit; however, a separate power source such as a battery may alternatively be provided.

While there have been described and illustrated specific embodiments of the invention, it will be clear that variations in the details of the embodiments specifically illustrated and described may be made without departing from the true spirit and scope of the invention as defined in the appended claims.

What is claimed is:

1. A position pointing device having a position pointing device and a tablet:

said position pointing device comprising:
a resonance circuit having a predetermined resonance characteristic,
an information setting means for setting pointing device information,
a resonance characteristic varying circuit for controlling said predetermined resonance characteristic to a particular resonance characteristic representing synchronous information and to a resonance characteristic expressing said set pointing device information according to external control,
a timing extracting means for extracting a plurality of sequential time slots during which an induced voltage having a predetermined duration occurs intermittently in the resonance circuit, and
a characteristic control means for controlling operations of said resonance characteristic varying circuit so that said particular resonance characteristic representing synchronous information is obtained during one of said time slots and said set providing device information is obtained during others of said time slots; and said tablet comprising:
an electric wave generating means for intermittently generating an electric wave, which intermittently drives the resonance circuit of the position pointing device, for a predetermined duration,
an electric wave detecting means for detecting an electric wave derived from the resonance circuit of the position pointing device,
a synchronous detecting means for detecting a preselected time slot from said detected electric wave, the preselected time being the slot during which the resonance characteristic of the resonance circuit of the position pointing device turns into said particular resonance characteristic representing the synchronous information,
an information identifying means for detecting the resonance characteristic of the resonance circuit of the position pointing device from the detected electric wave at plural ones of said time slots different from the time slot occupied by the synchronous information, the information identifying means converting information in the plural ones of said time slots into pointing device information, and
a coordinate detecting means for determining the coordinate value of a position pointed to by the position pointing device from said detected electric wave.

2. A position pointing device having a position pointing device and a tablet:

said position pointing device comprising:
a resonance circuit having a predetermined resonance characteristic,
an information setting means for setting pointing device information,
a resonance characteristic varying circuit for controlling said predetermined resonance characteristic to a particular resonance characteristic representing synchronous information and to a resonance characteristic expressing said set pointing device information according to external control,
a timing extracting means for extracting a plurality of sequential time slots during which an induced voltage having a predetermined duration occurs intermittently in the resonance circuit, and
a characteristic control means for controlling operations of said resonance characteristic varying circuit so that said particular resonance characteristic representing synchronous information is obtained during one of said time slots and said set providing device information is obtained during others of said time slots, the control means repeating the operations and inserting a period required for coordinate detection; and said tablet comprising:
an electric wave generating means for intermittently generating an electric wave, which intermittently drives the resonance circuit of the position pointing device for a predetermined duration,
an electric wave detecting means for detecting an electric wave derived from the resonance circuit of the position pointing device,
a synchronous detecting means for detecting a preselected time slot from said detected electric wave, the preselected time being the slot during which the resonance characteristic of the resonance circuit of the position pointing device turns into said particular resonance characteristic representing the synchronous information,
an information identifying means for detecting the resonance characteristic of the resonance circuit of the position pointing device from the detected electric wave at plural ones of said time slots different from the time slot occupied by the synchronous information, the information identifying means converting information in the plural ones of said time slots into pointing device information, and a coordinate detecting means for determining the coordinate value of a position pointed to by the position pointing device from electric waves detected during a period other than during said preselected time slot occupied by the synchronous information.

3. A position pointing device having a position pointing device and a tablet:

said position pointing device comprising:
a resonance circuit having a predetermined resonance characteristic,
an information setting means for setting pointing device information,
a resonance characteristic varying circuit for controlling said predetermined resonance characteristic to a particular resonance characteristic representing synchronous information and to a resonance characteristic expressing said set pointing device information according to external control,
a timing extracting means for extracting a plurality of sequential time slots during which an induced voltage having a predetermined duration occurs intermittently in the resonance circuit, and
a characteristic control means for controlling operations of said resonance characteristic varying circuit so that the particular resonance characteristic representing synchronous information is maintained during at least at two consecutive time slot sequences among a plurality of time slot sequences during which the induced voltage occurs intermittently, said particular resonance characteristic being obtained during a preselected time slot following said at least two consecutive time slot sequences, and the resonance characteristic expressing said set pointing device information being derived during time slots other than time slots including the synchronizing information; and said tablet comprising:
an electric wave generating means for intermittently generating an electric wave, which intermittently drives the resonance circuit of the position pointing device, for a predetermined duration,
all electric wave detecting means for detecting an electric wave derived from the resonance circuit of the position pointing device,
a synchronous detecting means for detecting from said detected electric wave at least two consecutive time slot sequences during which the resonance characteristic of the resonance circuit of the position pointing device represents said predetermined resonance characteristic, for the synchronous information, the two consecutive time slot sequences being followed by other time slots during which said particular resonance characteristic is derived,
an information identifying means for detecting the resonance characteristic of the resonance circuit of the position pointing device from the electric wave detected at time slots containing pointing device information other than the synchronous information and converting it into pointing device information, and
a coordinate detecting means for determining the coordinate value of a position pointed to by the position pointing device from said detected electric wave.

4. A position pointing device having a position pointing device and a tablet:

said position pointing device comprising:
a resonance circuit having a predetermined resonance characteristic,
an information setting means for setting pointing device information,
a resonance characteristic varying circuit for controlling said predetermined resonance characteristic to a particular resonance characteristic and also to a resonance characteristic expressing said set pointing device information according to external control,
a timing extracting means for extracting a plurality of sequential time slots during which an induced voltage having a predetermined duration occurs intermittently in the resonance circuit during predetermined intervals and lasts for a predetermination duration, and
a characteristic control means for controlling operations of said resonance characteristic varying circuit so that the predetermined resonance characteristic is sequenced through at least two consecutive series of timing operations, each timing operation including plural sequential time slots, said induced voltage occurring intermittently at each of said time slots, said particular resonance characteristic being obtained at a preselected timing which follows said at least two consecutive timing operations, the resonance characteristic expressing said set pointing device information being obtained at a particular one of the time slots based on said preselected timing, the control means repeating said operations and inserting a period necessary for coordinate detection; and said tablet comprising:
an electric wave generating means for intermittently generating an electric wave, which intermittently drives the resonance circuit of the position pointing device, for a predetermined duration,
an electric wave detecting means for detecting an electric wave derived from the resonance circuit of the position pointing device,
a synchronous detecting means for detecting from said detected electric wave at least two consecutive time slot sequences during which the resonance characteristic of the resonance circuit of the position pointing device represents said predetermined resonance characteristic for the synchronous information, the two consecutive time slot sequences being followed by time slots during which said particular resonance characteristic is derived,
an information identifying means for detecting the resonance characteristic of the resonance circuit of the position pointing device from the electric wave detected at times based on said preselected timing time slots containing pointing device information other than the synchronous information and converting it into pointing device information, and
a coordinate detecting means for determining the coordinate value of a position pointed to by the position pointing device from electric waves detected during time slots other than the time slot including the synchronizing information.

5. A position pointing device according to claim 4, wherein:

said position pointing device characteristic control means controls the resonance characteristic varying circuit so that the predetermined resonance characteristic is maintained during the coordinate detection period for several consecutive time slots during which the induced voltage intermittently occurs, the particular resonance characteristic including the synchronizing information being derived during a particular time slot following said several time slots, the resonance characteristic representing the pointing device information being obtained during plural time slots following said particular time slot including the synchronization information, and this series of operations being repeated: and the information identifying means of said tablet detects the resonance characteristic of the resonance circuit representing the set position pointing device information from electric waves detected during plural time slots following the preselected time slots including the position information and converting it to the pointing device information; and the coordinate detecting means determining the coordinate value of a position pointed to by the position pointing device from the electric waves detected plural times following the several time slots.

6. A position pointing device comprising:

a resonance circuit having a predetermined resonance characteristic;

an information setting means for setting pointing device information;

a resonance characteristic varying circuit for controlling said predetermined resonance characteristic to a particular resonance characteristic representing synchronous information and to a resonance characteristic expressing said set pointing device information according to external control;

a timing extracting means for extracting a plurality of sequential time slots during which an induced voltage having a predetermined duration occurs intermittently in the resonance circuit, and a characteristic control means for controlling operations of said resonance characteristic varying circuit so that said particular resonance characteristic representing synchronous information is obtained at a preselected timing among a plurality of timings at which said induced voltage intermittently occurs, the resonance characteristic expressing said set pointing device information being obtained at a particular timing based on said extracted timing.

7. A position pointing device comprising:

a resonance circuit having a predetermined resonance characteristic;

an information setting means for setting the pointing device information;

a resonance characteristic varying circuit for controlling said predetermined resonance characteristic to a particular resonance characteristic representing synchronous information and to a resonance characteristic expressing said set pointing device information according to external control;

a timing extracting means for extracting a plurality of sequential time slots during which an induced voltage occurs having a predetermined duration occurs intermittently in the resonance circuit and a characteristic control means for controlling operations of said resonance characteristic varying circuit so that said particular resonance characteristic representing synchronous information is obtained during one of said time slots and said set providing device information is obtained during others of said time slots, the control means repeating the operations and inserting a period required for coordinate detection.

8. A position pointing device comprising:

a resonance circuit having a predetermined resonance characteristic;

an information setting means for setting the pointing device information;

a resonance characteristic varying circuit for changing said predetermined resonance characteristic to the particular resonance characteristic and to the resonance characteristic expressing said set pointing device information in accordance with external control; and a characteristic control means for controlling said resonance characteristic varying circuit so that the predetermined resonance characteristic is sequenced through at least two consecutive series of timing operations, each timing operation including plural sequential time slots, said induced voltage occurring intermittently at each of said time slots, said particular resonance characteristic being obtained at a preselected time slot which follows said at least two consecutive timing operations, the resonance characteristic expressing said set pointing device information being obtained at a particular one of the time slots.

9. A position pointing device comprising:

a resonance circuit having a predetermined resonance characteristic;

an information setting means for setting the pointing device information;

a resonance characteristic varying circuit for controlling said predetermined resonance characteristic to a particular resonance characteristic and to a resonance characteristic expressing said set pointing device information in accordance with external control; and a characteristic control means for controlling operations of said resonance characteristic varying circuit so that the predetermined resonance characteristic is sequenced through at least two consecutive series of timing operations, each timing operation including plural sequential time slots, said induced voltage occurring intermittently at each of said time slots, said particular resonance characteristic being obtained at a preselected time slot which follows said at least two consecutive timing operations, the resonance characteristic expressing said set pointing device information being obtained at a particular one of the time slots, the control means repeating said operations and inserting a period necessary for coordinate detection.

10. A position pointing device according to claim 9, wherein the characteristic control means controls the resonance characteristic varying circuit so that the predetermined resonance characteristic is maintained during the coordinate detection period for eight consecutive time slots among the plural time slots during which the induced voltage intermittently occurs, the particular resonance characteristic being derived during a time slot following said eight time slots, the resonance characteristic representing the pointing device information being obtained during three slots following said time slot during which the particular resonance characteristic is derived, this series of timing operations being repeated.

11. A position pointing device according to claim 6, comprising a power supplying means consisting of a battery.

12. A position pointing device according to claim 6, comprising power supply means for extracting electrical energy for driving electric component units from an electric wave received by the resonance circuit.

* * * * *